D. H. WILSON AND R. G. HUTTON.
REINFORCED WELDED JOINT.
APPLICATION FILED SEPT. 14, 1918.
1,340,644.
Patented May 18, 1920.
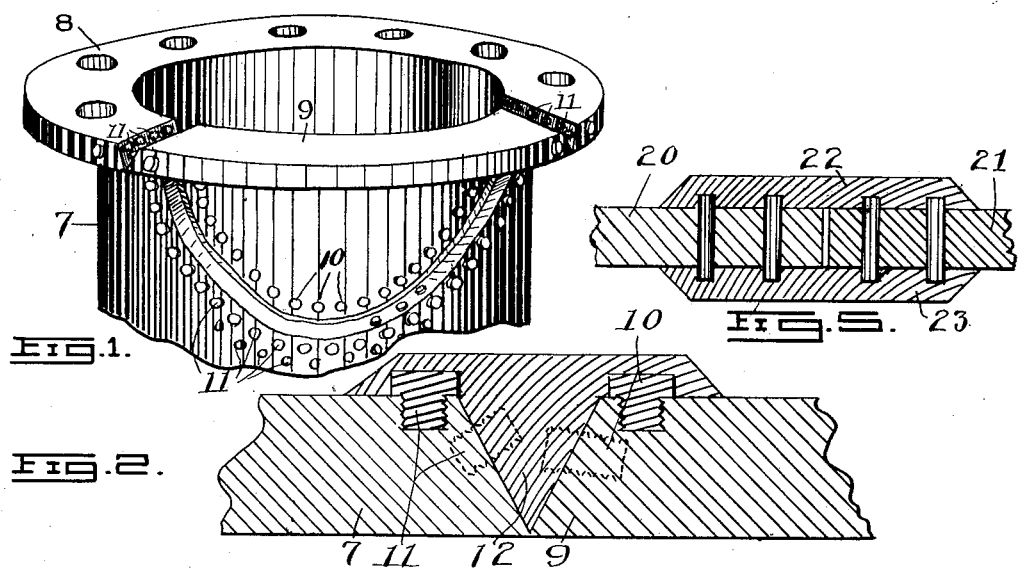
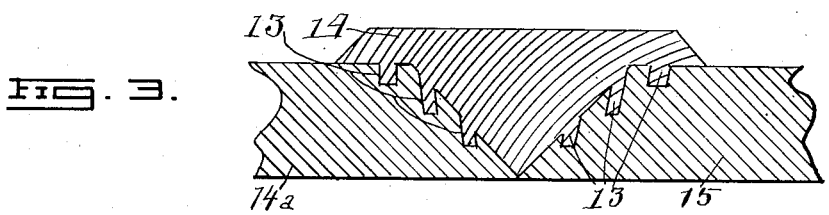
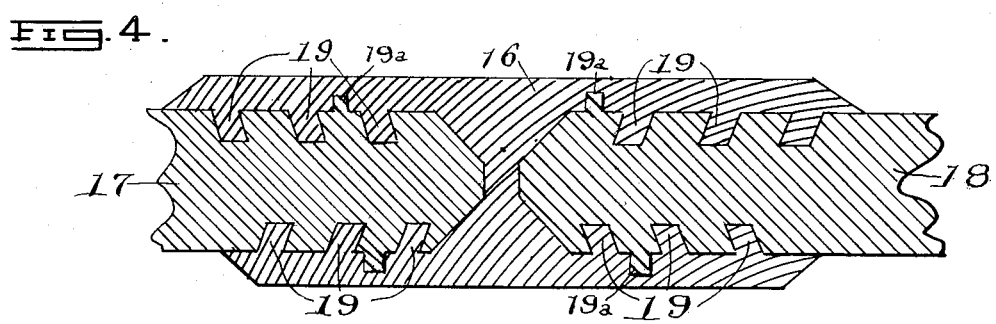
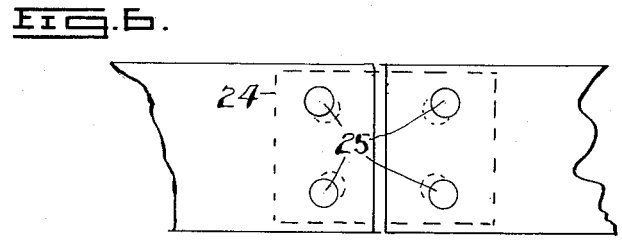
INVENTOR.
David H. Wilson
Robert G. Hutton.
BY
Myron F. Hill
ATTORNEY

UNITED STATES PATENT OFFICE.

DAVID H. WILSON, OF RIDGEWOOD PARK, AND ROBERT G. HUTTON, OF WORTENDYKE, NEW JERSEY.

REINFORCED WELDED JOINT.

1,340,644.　　　　　　　Specification of Letters Patent.　　Patented May 18, 1920.

Application filed September 14, 1918. Serial No. 254,153.

*To all whom it may concern:*

Be it known that we, DAVID H. WILSON and ROBERT G. HUTTON, citizens of the United States, and residents of Ridgewood Park and Fortendyke, respectively, in the county of Bergen and State of New Jersey, have invented a certain new and useful Reinforced Welded Joint, of which the following is a specification.

Our invention relates to an improved method of joining metal parts by electric arc welding. It pertains either to that type of electric welding where the metal is supplied from the electrode itself or of the type where it is supplied from an exterior source.

One object of the invention is to join portions or sections of two metals in such a manner that the joint has a large margin of safety to insure against faults, such as slag in the parts to be welded or other causes of weakness. The invention is not only adapted to the repair of cracked or broken parts of machinery, but is also applicable to joining new metal parts if so desired.

Our invention relates in particular to welded joints for uniting section of cast iron or other metal together, or to uniting patches to such metal for repair purposes or for various processes of manufacture.

As electric welding has been hitherto practised in the repair of machine parts, the customary method has been to merely fill in the cracks or voids with the deposited welding metal. In the use of this ordinary process a difficulty arose when it was attempted to weld cast iron such as occurs in engine cylinders or other machinery, especially when the parts were to be subjected to excessive strains and wear. It was found that such cast metal was often imperfect, being porous and containing slag pockets. This sometimes made it impossible to secure a tight joint, and in other cases the joint was not sufficiently strong or durable to resist the strain to be put upon it or to afford a sufficient margin of safety when the welded part was to be subjected to unusually severe operating conditions.

In our invention we have avoided the difficulties hitherto encountered by reinforcing the welded joints. The reinforcement may be accomplished in many ways. Grooves or holes may be previously made in the metal castings or other metal formations which it is desired to join, into which the deposited welding metal is caused to flow during the welding process. The joints may also be reinforced by embedding projections or studs in the metal parts. If desired, separate devices, such as pins or bolts, may also be used to interlock the two, the whole being welded into an integral mass.

Engines or various other forms of machinery may be repaired by welding in patches by means of our joint, and where operations of magnitude depend upon the continuous operation of repaired or built up mechanical devices, as a ship depends upon its engines, our joint is of particular value. It may be useful in almost any kind of welding.

In the accompanying drawing which illustrates by way of example several ways in which the invention may be carried out;

Figure 1 shows a part of an engine cylinder with a patch located ready for welding.

Fig. 2 shows a section of a finished joint.

Figs. 3, 4, 5 and 6 show modifications.

Referring to Fig. 1, numeral 7 indicates an engine cylinder 7 having a flange 8. A patch 9 is shown located ready for welding. It may be of cast iron or steel or any other suitable material. If of cast iron screw threaded pins or bolts 10 may be secured to the patch, and the pins or bolts 11 are threaded into the cylinder 7 if of cast iron. The edges of the joint may be beveled to form a V-groove to receive the welding metal, which is deposited also around the ends of the pins or bolts thereby acquiring a mechanical grip upon the sections thus uniting them into a solid mass.

The top of the flange of the patch may then be machined off, and if necessary the inside of the cylinder, holes drilled in the flange, and the head of the cylinder bolted on.

In Fig. 3 is shown a modified form of reinforcement. Holes or grooves 13 are shown as substitutes for bolts and are adapted to receive the welding metal 14 and provide the mechanical grip, thereby uniting sections 14$^a$ and 15.

Fig. 4 shows another form of joint in which the welding metal 16 is applied to both sides of the edges of the sections 17 and 18, holes or grooves 19 or lugs 19$^a$ being provided to supply the reinforcement or mechanical grip in the joint.

In Fig. 5 is shown a modified form of reinforcement. Pins are shown passing through the two sections 20 and 21, and welding metal 22 and 23 applied around their ends.

Fig. 6 indicates another form of joint in which welded metal is applied within the area indicated by the broken lines 24 on one or both sides and entering the holes 25 which may incline toward each other.

Many variations of our invention are possible without departing from its spirit.

What we claim is:—

1. A reinforced welded joint comprising welding metal united to other metal by welding and projecting members on the one engaging the other to form a mechanical grip to reinforce the joint.

2. The combination claimed in claim 1, said other metal being cast iron.

3. The combination claimed in claim 1, having said projecting members formed of non-welded steel embedded in said other metal.

4. The combination claimed in claim 1, having said projecting members consisting of rods.

5. The combination claimed in claim 4 having said rods screw threaded.

6. The combination claimed in claim 5 said rods having bolt heads thereon.

7. The combination claimed in claim 1 having said projecting members inclined toward each other.

8. The method of joining metals by electric welding which consists in providing the edges of two metal parts with projecting studs, and filling the space between the metals and around the reinforcing studs with metal deposited by a welding arc.

Signed at New York, in the county of New York and State of New York this 30th day of October, A. D. 1917.

DAVID H. WILSON.
ROBERT G. HUTTON.

Witness:
MYRON F. HILL.